Patented Feb. 28, 1933

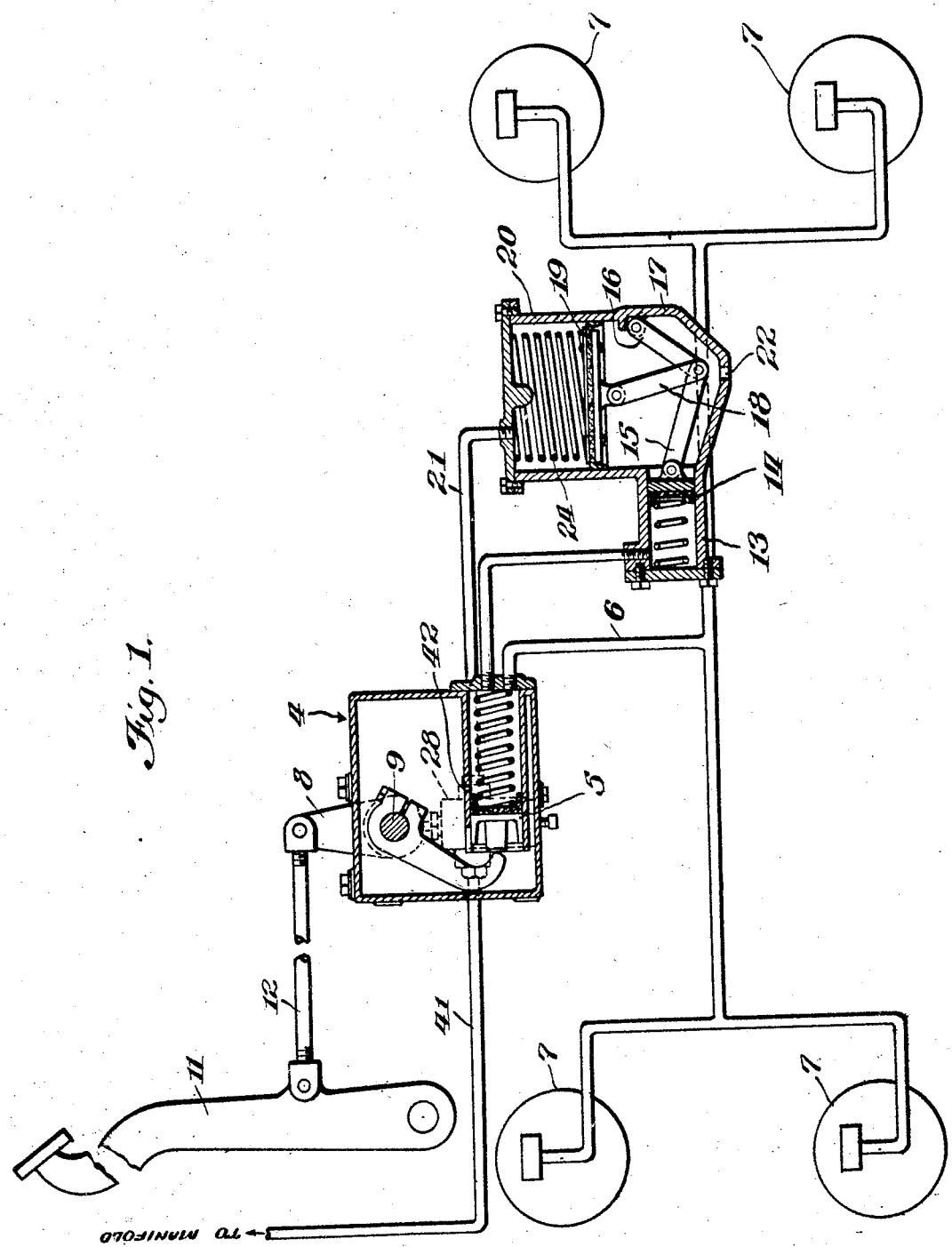

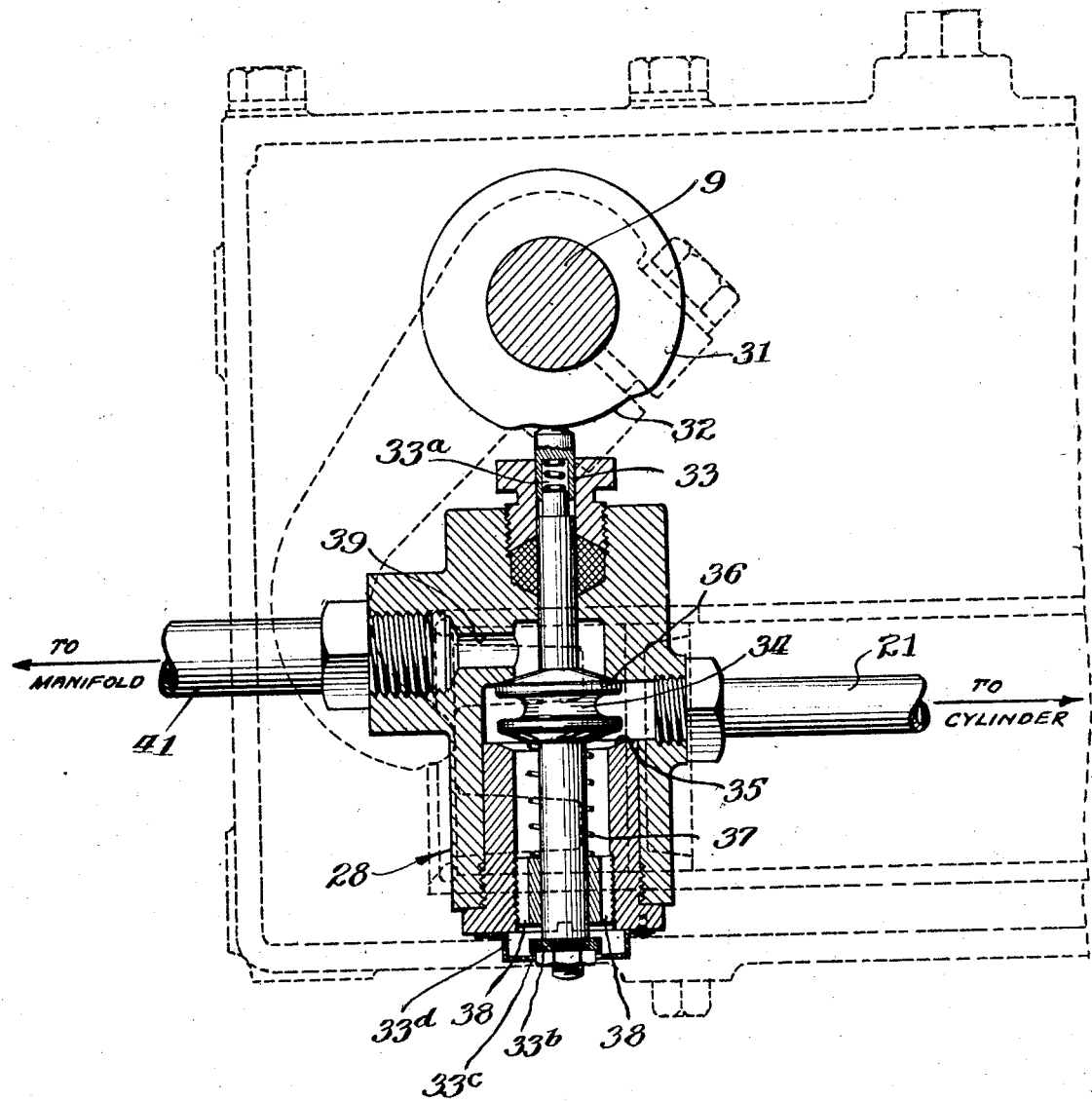

1,899,009

UNITED STATES PATENT OFFICE

CLIFFORD C. BRADBURY, OF GLENCOE, ILLINOIS, ASSIGNOR TO HYDRAULIC BRAKE COMPANY, OF LOS ANGELES, CALIFORNIA, A CORPORATION OF CALIFORNIA

SLACK REMOVER FOR HYDRAULIC BRAKE SYSTEMS

Application filed December 21, 1929. Serial No. 415,648.

This invention relates to a fluid pressure operated brake system and more particularly to a device for applying an initial pressure to the brake system.

In a fluid pressure operated brake system a considerable movement of the pressure applying apparatus is sometimes required to remove the slack from the system which is due in part to lost motion resulting from play between the mechanically interconnected parts and to the clearance between the brake shoes and brake drums when the brake shoes are withdrawn from the drums.

An object of the invention is to provide an improved fluid pressure operated brake system.

A further object of the invention is to provide a device for applying an initial pressure to the system prior to the operating pressure.

A further object of the invention is to provide a device for removing the slack from the fluid pressure system which is operated by energy supplied by the motor of the vehicle in which the system is used.

Other objects and advantages of the invention will appear from the following description taken in conjunction with the accompanying drawings, in which Fig. 1 is a cross-section, partly schematic, of a fluid pressure operated brake system embodying the invention; and Fig. 2 is a cross-section of the valve mechanism for the initial pressure applying device showing the master cylinder in dotted outline.

Referring to the drawings, and more particularly to Fig. 1, a master cylinder 4 is shown having a piston 5 reciprocally mounted therein for the purpose of supplying a fluid pressure through a tube 6 to brakes 7. The piston 5 is actuated by a lever 8 pivotally mounted upon a shaft 9 and connected to a manually operated pedal 11 by a link 12.

In order to obviate the necessity of moving the piston 5 of the master cylinder a substantial distance in order to remove the slack from the pressure system a secondary cylinder 13 having a piston 14 is provided for the purpose of applying an initial fluid pressure to the system before piston 5 has had time to move very far. A connecting rod 15 is attached to the piston 14 and the opposite end of the connecting rod is attached to a link 16 which is pivotally attached to casing 17. Connecting rod 15 and link 16 form a toggle which is actuated by a connecting rod 18 of a piston 19 reciprocally mounted in a cylinder 20. Piston 19 of cylinder 20 is actuated by evacuating the cylinder 20 through a tube 21 which connects the cylinder to the intake manifold of the motor vehicle through a valve 28 and tube 41. When the cylinder is evacuated the atmospheric pressure entering casing 17 through an aperture 22 forces the piston 19 upwardly.

The piston 19 is made of considerably larger cross-section than the piston 14, which, together with the fact that piston 19 actuates piston 14 through a toggle, renders the pressure on piston 19 much more effective to cause movement than the pressure on piston 14. As soon as piston 19 has moved a sufficient distance to straighten the toggle and bring connecting rod 15 and link 16 into alignment the back pressure upon piston 14, due to the brake operating pressure in the fluid pressure system, will be ineffective to reverse the movement of piston 14.

Cylinder 20 is connected to the intake manifold of the motor by means of the valve 28. Mounted upon shaft 9 is a circular cam 31 having a reduced portion 32 in which a stem 33 of valve mechanism 28 rests when lever 8 is in its inoperative position. The valve stem 33 is provided with a double valve head 34 which may be moved so as to be in engagement with valve seat 35 or valve seat 36. A spring 37 normally holds valve 34 in engagement with seat 36, in which position cylinder 20 is connected through tube 21 with a plurality of ports 38 in the valve head which lead to the atmosphere. Upon a slight rotation of cam 31, valve stem 33 is depressed, engaging valve head 34 with seat 35 and connecting cylinder 20 through a port 39 and tube 41 to the intake manifold of the motor of the vehicle.

I preferably make the valve stem 33 in two parts separated by a spring 33a as this construction makes it possible to use a cam 31 having a rise slightly greater than the distance between the valve seats 35 and 36, thereby reducing the cost which would otherwise result from the necessity of machining the cam 31 so that the rise is exactly equal to the distance between the valve seats 35 and 36. The spring 33a of course is stronger than the spring 37 which tends to hold the valve 34 against valve seat 36.

The operation of the apparatus is as follows:

When the operator depresses pedal 11 the movement is communicated through link 12 to lever 8, causing the rotation of shaft 9. A slight rotation of shaft 9 will depress the valve stem 33 and connect the cylinder 20 to the intake manifold of the motor in which a constant vacuum is maintained by the operation of the motor, thereby withdrawing the air from the cylinder. Initial downward movement of valve stem 33 causes washer 33b on the lower end of the stem to enter opening 33c in member 33d secured to the lower end of the valve casing, thus cutting off communication between the interior of the valve casing and atmosphere and preventing inrush of air to the engine manifold while the valve 34 is shifting between the valve seats 35 and 36. Prior to depression of valve stem 33 piston 5 has been moved sufficiently to close the port 42 through which the master cylinder communicates with the interior of the reservoir 4 when the piston 5 is in its fully retracted position.

Upon the evacuation of the cylinder atmospheric pressure entering casing 17 through the opening 22 will move piston 19 upwardly, causing connecting rod 18 to straighten the toggle joint between connecting rod 15 and link 16, thereby moving piston 14 into cylinder 13 to apply an initial pressure to the fluid pressure system, removing the slack therefrom, and lightly engaging the brake shoes with the brake drum. As the rod 18 makes its initial movement upwardly, the link 16, being pivoted to the casing 17, swings through an arc and causes a relatively great movement of the connecting rod 15 and the piston 14, whereas subsequent movement of the rod 18 effects slight movement of the piston 14 as the link 16 and the connecting rod 15 approach a straight line.

The pressure thus created in the pressure system by the cylinder 13 and piston 14 is not sufficient to produce a braking effect. When the piston 14 has moved sufficiently to remove the slack from the system the master cylinder will have moved very little. The further movement of the master cylinder building up a brake operating pressure in the system will not reverse the movement of piston 14 due to the fact that the toggle joint between connecting rod 15 and link 16 will be straight.

Since the cam is circular for the greater part of its circumference the further movement of pedal 11 will not affect the valve mechanism 28, and stem 33 of the valve mechanism will remain depressed until pedal 11 and lever 8 return to their normal position. The slack removing pressure therefore will remain effective until the pedal 11 and lever 8 are returned to their normal position. As soon as the lever 8 is returned to its normal position spring 37 will shift valve 34 to its seat 36 and connect cylinder 20 to the atmosphere, allowing spring 24 to return piston 19 to its normal position. The apparatus described provides a simple and effective means for insuring that substantially the entire movement of the piston of the master cylinder will be effective for applying the brakes.

Having described the nature and embodiments of my invention, what I desire to secure by United States Letters Patent is as follows:

1. In a fluid pressure operated system, a main pressure means for producing a pressure in the system, a secondary pressure means comprising a pressure cylinder connected to the pressure system, a piston in said cylinder, a connecting rod attached to the piston, a link connected to the connecting rod forming a toggle with the connecting rod, and means for operating the toggle to cause the piston to produce an initial pressure prior to the pressure of the main pressure means.

2. In a fluid pressure operated system, means for applying an operating pressure to the system, means for applying a slack removing pressure prior to the operating pressure, comprising a cylinder, a piston within the cylinder, and means for moving the piston a predetermined distance to remove the slack from the system and locking it in position until the operating pressure is released, the last said means comprising a vacuum operated piston and a toggle mechanism operably connecting said pistons together.

3. The combination in a fluid pressure operated brake system of means for producing a brake operating pressure, a cylinder and piston for producing a slack removing pressure in the system, said piston offering resistance to movement in a slack removing direction, a second cylinder and piston operative in response to the initial movement of the means for producing the brake operating pressure, the piston of the second cylinder being interconnected with the piston of the slack removing cylinder by a link mechanism adapted to reduce the effect on the second piston of the resistance offered by the slack removing piston.

4. The combination with a fluid pressure operated brake system, of means for removing slack from the system comprising a slack removing cylinder, a piston for said cylinder, a connecting rod pivotally attached thereto, a link pivotally attached to the connecting rod forming a toggle, a fluid pressure operated cylinder, and a piston for said cylinder, said piston being conected to the toggle whereby the movement of the fluid pressure operated piston results in a movement of the slack removing piston.

5. In a fluid pressure operated brake system, means for removing slack from the system, comprising a slack removing cylinder, a piston for said cylinder, a fluid operated cylinder, a piston for said cylinder, and variable leverage mechanism connecting said pistons, causing the initial movement of the fluid operated piston to result in a large movement of the slack removing piston and a subsequent movement of the fluid operated piston to result in a small movement of the slack removing piston.

6. In a fluid pressure operated brake system, slack removing means for the system, comprising a slack removing cylinder, a piston therefor, a fluid pressure operated cylinder, a piston therefor, a link mechanism for communicating the movement of the fluid pressure operated piston to the slack removing piston, and a rigid part receiving the entire thrust of said slack removing piston when said piston is in its forward position.

7. In a fluid pressure operated brake system, a master cylinder for producing a brake operating pressure, a piston for the master cylinder, means for actuating the master cylinder piston, a secondary cylinder for removing slack from the system, a piston for the secondary cylinder, a connecting rod attached to the secondary piston, a link pivotally connected to the connecting rod forming a toggle, a fluid pressure cylinder, a piston for the fluid pressure cylinder, a connecting rod connecting the piston of the fluid pressure cylinder with said toggle, and means for connecting the fluid pressure cylinder to a low pressure source upon the initial movement of the means for actuating the master cylinder piston, therby producing a slack removing pressure in the system prior to the brake operating pressure.

8. In a fluid pressure operated brake system, a cylinder connected to said system and a piston therefor, a connecting rod connected to said piston, a fluid pressure cylinder having a piston, a connecting rod connected to the piston of the fluid pressure cylinder, a casing connecting the first mentioned cylinder with the fluid pressure cylinder, a link pivotally mounted in said casing means pivotally connecting the free ends of said connecting rods together and to the free end of said link, and means for actuating the piston of the fluid pressure cylinder whereby the piston of the first mentioned cylinder will be moved forward to produce a slack removing pressure in the system.

In witness whereof, I hereunto subscribe my name this 18 day of December, 1929.

CLIFFORD C. BRADBURY.